United States Patent [19]
Taneda

[11] Patent Number: 5,378,866
[45] Date of Patent: Jan. 3, 1995

[54] ELECTRIC DISCHARGE MACHINING SYSTEM HAVING A SECONDARY POWER SUPPLY INCLUDING A CONTROLLABLE VOLTAGE SOURCE AND IMPEDANCE

[75] Inventor: Atsushi Taneda, Aichi, Japan

[73] Assignee: Mitsubishi Denki Kabushiki Kaisha, Tokyo, Japan

[21] Appl. No.: 188,851

[22] Filed: Jan. 31, 1994

Related U.S. Application Data

[63] Continuation of Ser. No. 915,546, Jul. 20, 1992, abandoned.

[30] Foreign Application Priority Data

Jul. 26, 1991 [JP] Japan .................. 3-187500

[51] Int. Cl.6 .............................. B23H 1/02
[52] U.S. Cl. ................................ 219/69.18
[58] Field of Search ..................... 219/69.13, 69.18

[56] References Cited

U.S. PATENT DOCUMENTS

| | | | |
|---|---|---|---|
| 2,979,639 | 4/1961 | Williams et al. | 219/69 |
| 3,504,154 | 3/1970 | Marcolini | 219/69.13 |
| 3,532,850 | 10/1970 | Schulz et al. | 219/69.13 |
| 3,609,281 | 9/1971 | Kauffman | 219/69.13 |
| 3,655,936 | 4/1972 | Saito et al. | 219/69.13 |
| 4,447,713 | 5/1984 | Tsurumoto et al. | 219/69.16 |
| 4,673,791 | 6/1987 | Konno et al. | 219/69.13 |
| 4,945,199 | 7/1990 | Tanaka et al. | 219/69.13 |
| 5,064,984 | 11/1991 | Yamamoto et al. | 219/69.13 |
| 5,162,631 | 11/1992 | Hachisuka et al. | 219/69.13 |

FOREIGN PATENT DOCUMENTS

| | | |
|---|---|---|
| 60-27008 | 6/1985 | Japan . |
| 61-136731 | 6/1986 | Japan . |
| 2016347 | 9/1979 | United Kingdom . |

OTHER PUBLICATIONS

European Search Report, No Publication Date.

Primary Examiner—Geoffrey S. Evans
Attorney, Agent, or Firm—Sughrue, Mion, Zinn, Macpeak & Seas

[57] ABSTRACT

An electronic discharge machining system in which an electrode and workpiece are coupled between first and second power supply circuits. The first power supply circuit includes a DC power source, a switching element, and a current limiting resistor, which are controlled by a control circuit. The second power supply circuit includes a machining gap status detecting DC power supply, which is composed of a voltage source and a controllable output impedance, and a switching element, all of which are controlled by a control circuit. The secondary power supply circuit is controlled by the control circuit, which sets and controls the voltage source and/or the output impedance of the machining gap status detecting DC power supply in accordance with machining conditions, such as the voltage detected across the machining gap.

16 Claims, 5 Drawing Sheets

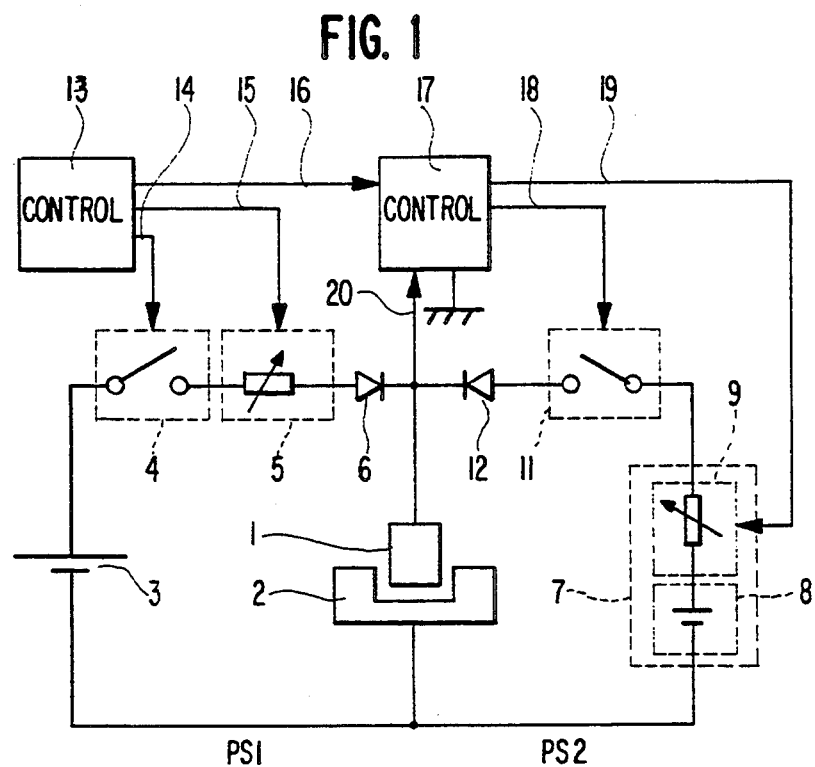
FIG. 1
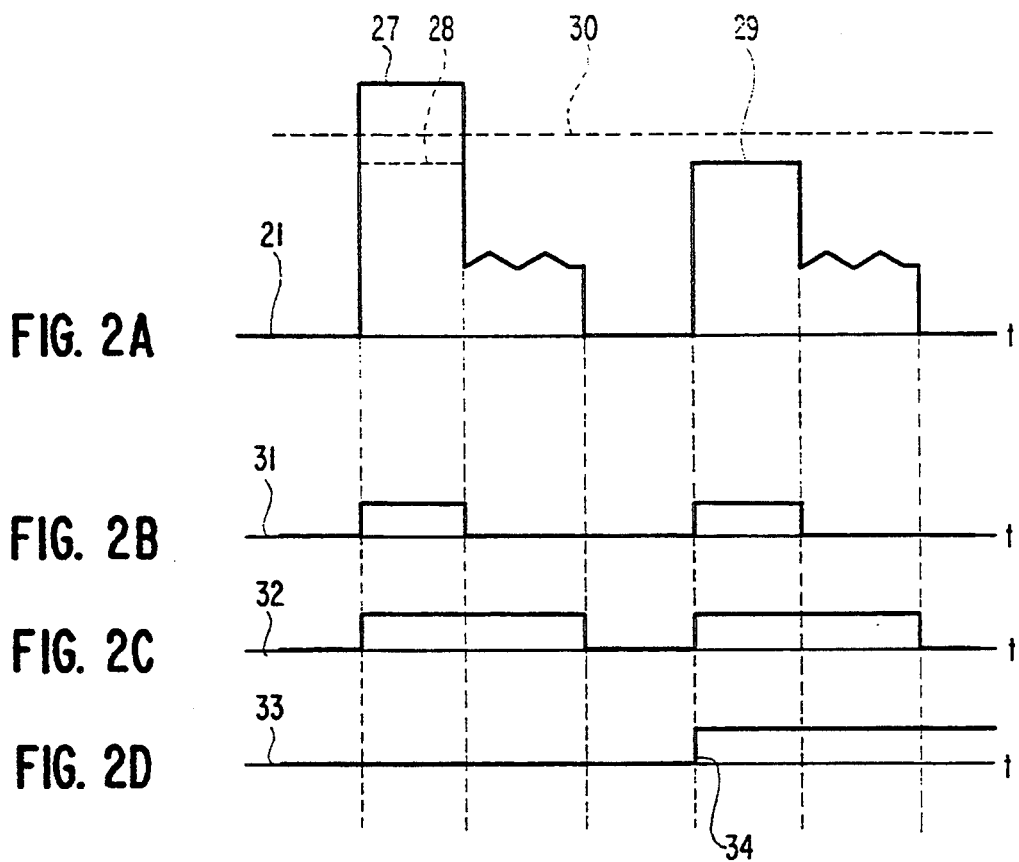
FIG. 2A
FIG. 2B
FIG. 2C
FIG. 2D

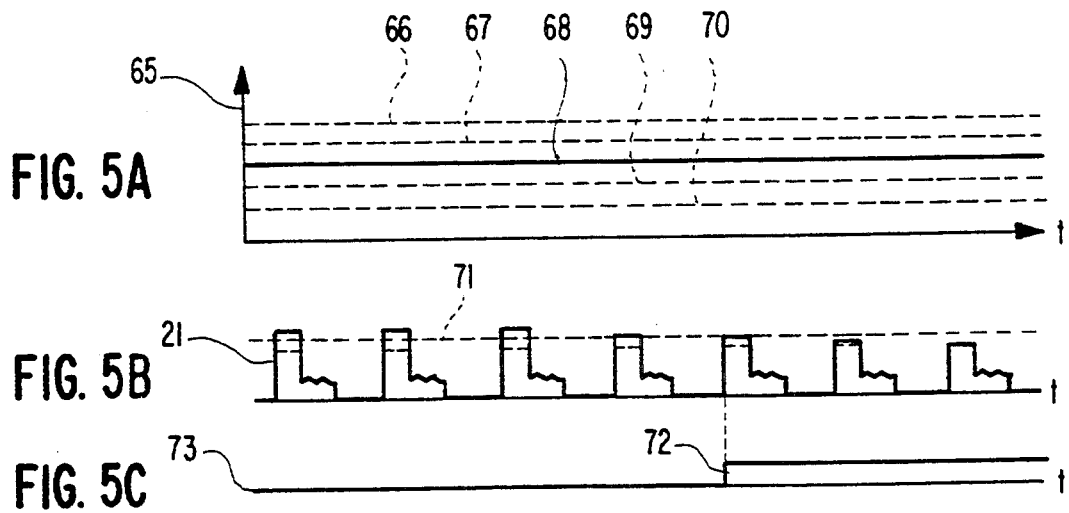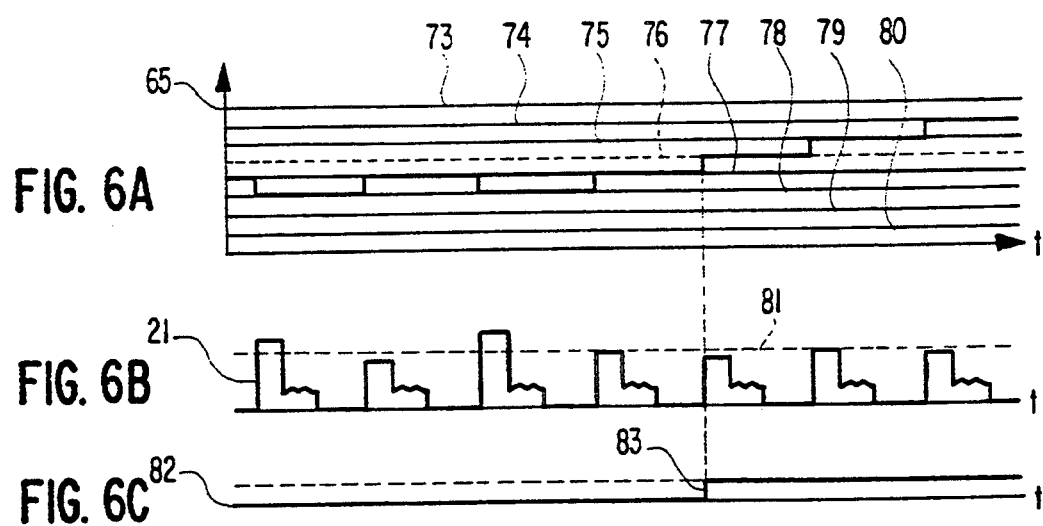

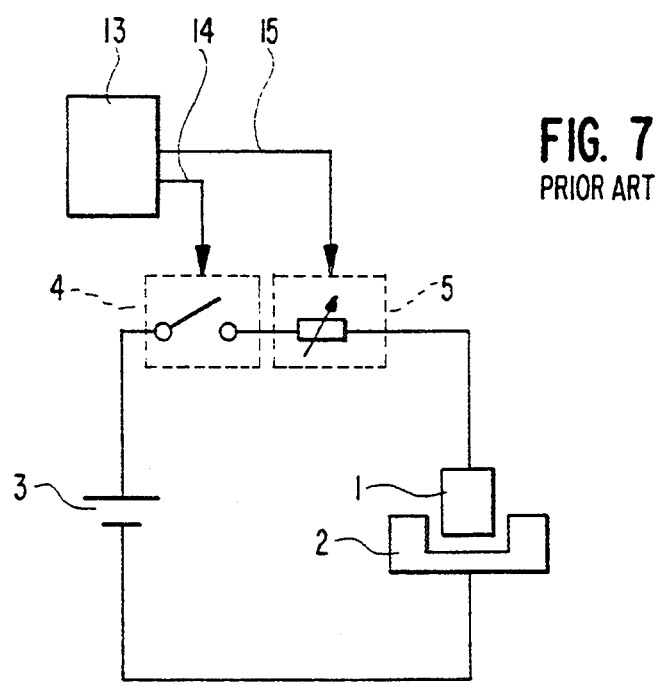
FIG. 7
PRIOR ART
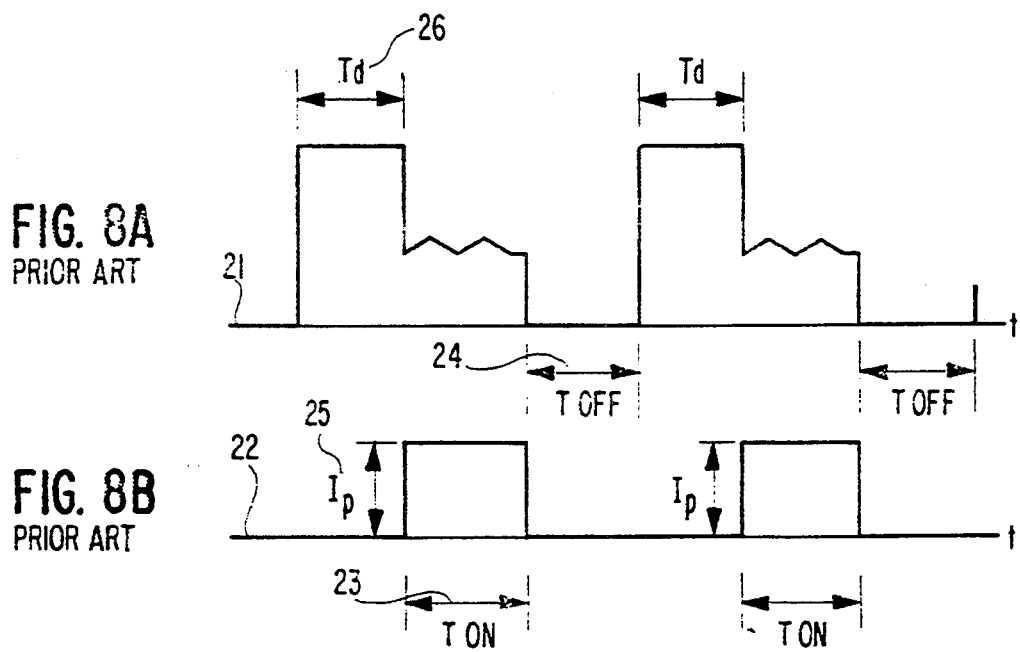
FIG. 8A
PRIOR ART
FIG. 8B
PRIOR ART
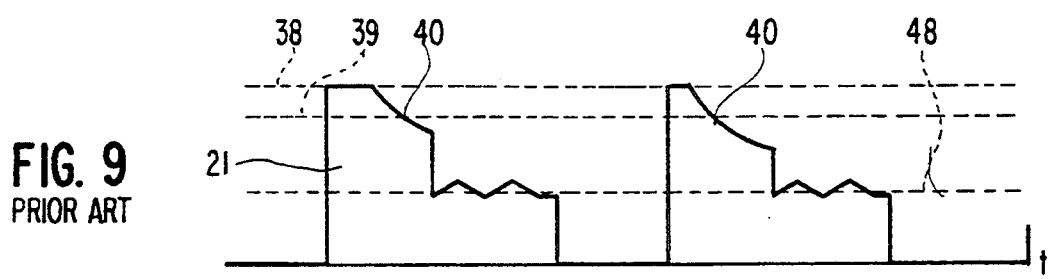
FIG. 9
PRIOR ART

ELECTRIC DISCHARGE MACHINING SYSTEM HAVING A SECONDARY POWER SUPPLY INCLUDING A CONTROLLABLE VOLTAGE SOURCE AND IMPEDANCE

This is a continuation of application Ser. No. 07/915,546 filed Jul. 20, 1992, now abandoned.

BACKGROUND OF THE INVENTION

1. Field of the Invention

An electric discharge machining system is known in the art which melt-processes a material, e.g., a conductive metal, by taking advantage of high-temperature energy generated at the time of electrical discharge. In this electric discharge machining system, machining conditions for defining machining energy are usually set in accordance with a machining operation to be performed.

While these machining conditions are set prior to machining, some of them are automatically changed and controlled in accordance with a machining status during machining.

The present invention relates to a power supply for an electric discharge machining system which allows a machining status required for automatic control of machining conditions to be detected.

2. Description of the Background Art

In an electric discharge machining system, a machining gap formed between an electrode and a workpiece, both made of conductive materials, usually exists within a dielectric fluid comprising an insulating material such as oil. A power supply is connected between the electrode and workpiece to generate an electrical discharge across the gap. Generally, this power supply for the electric discharge machining system uses direct current. A capacitor and a switching element, used for repeated charge and discharge, are inserted between the power supply and the machining gap to supply a pulse-shaped voltage and current.

FIG. 7 shows an example of a power supply circuit known in the art for use with a electric discharge machining system. FIGS. 8A and 8B illustrate the waveforms of a voltage and a current supplied to the machining gap.

The machining gap formed by an electrode 1 and a workpiece 2 for defining a machined shape is supplied with machining electrical energy by a DC power supply 3. A current peak value 25 (hereinafter referred to as "Ip 25"), representing the magnitude of this electrical energy, is controlled by a machining current controlling resistor 5 in accordance with the machining speed and finish required for the workpiece. Machining current is usually supplied as a pulse whose time duration is controlled by a switching element 4. The switching element 4 is controlled by a controller 13 which outputs a control signal on the basis of a preset discharge pulse generation time (hereinafter referred to as "Ton 23") and a stop or off time (hereinafter referred to as "Toff 24").

An electrode feeder, not illustrated, is generally provided which keeps the machining gap distance constant by feeding the electrode during the process of workpiece machining, whereby discharge is maintained. Further, if the discharge is disturbed by a short circuit at the machining gap, caused by sludge or the like produced during machining, the electrode feeder recovers insulation by raising the electrode to increase the machining gap length.

For electric discharge machining, the above mentioned electrical circuit is designed generally and parameters such as Ip 25, Ton 23 and Toff 24 may be reset as machining conditions according to the machining operation to be performed.

Influenced by machined shape, machining depth, etc., however, the electronic discharge machining status does not always remain the same if the machining conditions are kept constant. For example, if the area to be machined is small and the parameters Ip 25, Ton 23, Toff 24, etc., remain unchanged, the discharge energy applied per unit machined area becomes larger and machining debris (sludge) existing in the machining gap increases, resulting in a changed machining condition. In addition, since the amount of sludge discharged from the machining gap decreases as machining depth increases, the existing sludge increases, resulting in yet a further changed machining condition.

Still worse, if the amount of sludge existing in the machining gap exceeds a predetermined value in electric discharge machining, proper discharge cannot be maintained, leading to a centralized or concentrated discharge (hereinafter referred to as an "arc") status which causes damage to the electrode 1 and the workpiece 2.

In electric discharge machining, therefore, the preset machining conditions need to be changed and controlled in accordance with a momentarily detected machining condition. As a result, the essential parameters Ip 25 and Toff 24, which allow the machining gap status to be controlled, are often set and controlled automatically.

To enable this automatic control, the status of the machining gap must be detected and identified accurately. Among machining gap detecting processes is the measurement of the degree of insulation reduction in the machining gap, i.e. the measurement of a resistance value or impedance in the machining gap. FIG. 9 shows one of the known methods for detecting a reduction in machining gap impedance using a voltage waveform in the machining gap.

During a "no-load time" 38, extending from the initial application of a voltage to the machining gap to the start of discharge, the supply voltage of the machining power supply (3 in FIG. 7) is output to the machining gap. As more conductive sludge begins to accumulate in the machining gap in the process of machining, the pre-discharge machining gap voltage under no load will decrease. If the no-load voltage falls below a preset detection level 39, it is determined that the machining gap status is abnormal, and the machining conditions such as Toff 24 are changed.

However, using this process it is often difficult to differentiate between a voltage reduction that occurs before a discharge start and a voltage reduction that is caused by a discharge start. This is because the transition from the no-load voltage, due to the discharge start, to the discharge voltage 48 is not always so abrupt in discharges occurring before the machining gap status becomes abnormal. Namely, the voltage reduction due to the discharge start may sometimes be judged as an abnormal machining gap status. To prevent this misoperation, judgement can be facilitated by increasing the voltage of the power supply 3 and significantly raising the voltage 38 impressed across the gap. However, since the impressed voltage is among the machining conditions, varying the impressed voltage will itself change the machining status. Hence, it is not possible to vary the impressed voltage alone.

FIG. 10 shows a second process for detecting the machining gap impedance.

In this process, a voltage 41 lower than an arc voltage 48 is impressed to prevent discharge from occurring during Toff 24 when the discharge voltage is not applied. The machining status is judged as abnormal if the voltage 41 falls below a predetermined detection level 42. Since detection is made during a period of time independent of discharge, this process allows accurate detection with less mis-detection.

However, when the stop time is reduced to an extremely short time (several microseconds), e.g., under finishing conditions, the reflective waveform of the circuit appears relatively larger and the next voltage application is initiated without a stationary status being reached. This leads to an extreme difficultly in detecting the voltage during a stop. An example in FIG. 11 shows that the voltage during the stop changes so as to rise above and fall below an abnormal status detection level 46. In such a case, an abnormal status is mis-detected. Further, voltage application during the stop time reduces a deionization effect in the machining gap and causes insulation reduction, resulting in unincreased machining speed.

As described above, the power supply for the electric discharge machining system is controlled to vary the machining conditions, such as Ip and Toff, by detecting an arc or an abnormal status. The origin of such control, i.e., machining gap impedance detection performance, has not always been satisfactory in terms of accuracy and reliability. Therefore, arc status cannot be avoided reliably and maximum machining speed cannot be provided with ease.

SUMMARY OF THE INVENTION

It is an object of the present invention to provide a power supply for an electric discharge machining system which avoids the above problems of the prior art, and which permits easy and reliable detection of abnormal machining conditions or abnormal gap conditions, so as to allow more stable control of an electric discharge machining system during operation.

BRIEF DESCRIPTION OF THE DRAWINGS

FIG. 1 is a circuit diagram according to an embodiment of the present invention.

FIGS. 2A–2D are operation timing charts of a power supply according to the present invention.

FIGS. 5A–5C and 6A–6C show operation timing charts according to a second embodiment, where the output voltage of a secondary power supply is varied.

FIG. 7 is a circuit diagram of a power supply according to the prior art.

FIGS. 8A and 8B show a machining gap voltage waveform and current waveform during machining.

FIG. 9 is a machining gap voltage waveform diagram illustrating an example of a machining gap impedance reduction detected from a no-load voltage waveform in the prior art system.

DESCRIPTION OF THE PREFERRED EMBODIMENTS

Figure 3A:
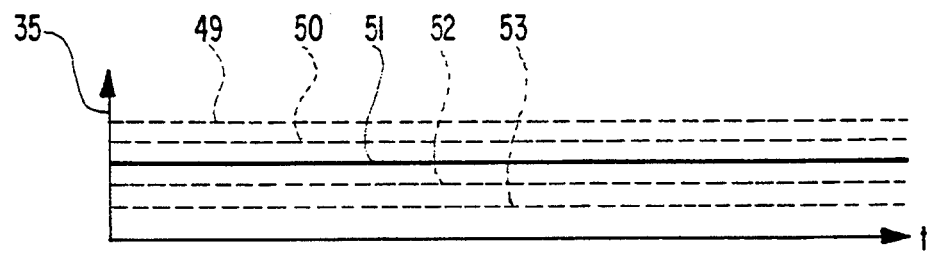
FIGS. 3A–3C are timing charts illustrating the operation of detecting machining gap impedance when a detecting power supply is set to a given output impedance for certain machining conditions.

A circuit according to an embodiment of the present invention is illustrated in FIG. 1 and the operation thereof is shown in FIGS. 2A–2D.

The system shown in FIG. 1 includes a second power supply circuit, in addition to a first machining power supply circuit comprised of, an electrode 1, workpiece 2, DC power supply 3, a switching element 4 and current limiting resistor 5. The second power supply circuit comprises a machining gap status detecting DC power supply 7, a switching element 11 and a control circuit 17 for setting and controlling the above components in accordance with machining conditions and the results of a detection of the machining gap status. The machining conditions, such as the machining gap voltage, and the results of the detection of the machining gap status are applied to the control circuit 17 by the signal line 20.

To prevent interference between the two power supply circuits, rectifiers 6 and 12 are provided in the individual circuits. The numeral 8 indicates the voltage source of the detecting power supply 7, and 9 indicates the output impedance thereof. A control circuit 13 is operative to control the switching element 4 and the current limiting resistor 5 in accordance with machining conditions.

The operation of the first embodiment will now be described with reference to FIGS. 2A–2D.

In FIG. 2B, the waveform 31 indicates the operation timing of the switching element 11 which causes the detecting power supply 7 to conduct. In FIG. 2C, waveform 32 is that of the switching element 4 which causes the machining power supply 3 to conduct. The output impedance 9 of the detecting power supply 7 is set beforehand to a value slightly higher than the resistance of the current limiting resistor 5 in the machining power supply 3, and the voltage of supply 8 is set to a value higher than the voltage of the machining power supply 3, preferably by more than 20V.

As seen in FIG. 2A, a voltage is applied to the machining gap by the two power supplies. Assume that the machining gap is far from arc status and that a small amount of sludge exists therein. Since the insulation state is high and the impedance is extremely high in the machining gap, the current supplied by the detecting power supply 7 of high output impedance causes the machining gap voltage to be detected as a voltage 27 higher than a voltage 28 provided by the machining power supply 3 and close to the detecting power supply voltage 8.

As conductive sludge increases and the impedance reduces in the machining gap in the process of machining, the machining gap voltage falls because a sufficient current cannot be supplied by the detecting power supply 7 which has been set to a high output impedance. When the machining gap voltage has dropped below a preset detection level 30, as indicated by 29, it is judged that the machining gap status is abnormal and a detection signal 34 (FIG. 2D) is output. Arc status can be avoided by changing the machining conditions, such as Toff, according to the machining gap voltage.

In the conventional techniques, it has been described that the machining conditions change by varying the voltage applied during the no-load time (26 in FIG. 8A). In the first embodiment of the present invention, the voltage impressed during the no-load time is higher than the machining voltage but the output impedance has been set to be relatively sufficiently higher to make the energy supplied to the machining gap small. This allows the voltage to be applied with the machining status remaining almost unchanged. The detection level is varied not only by the machining conditions but also by the output impedance of the detecting power supply 7. For this reason, detection can be made at an identical detection level 30 by setting and changing the detecting power supply impedance appropriately for a wide range of machining conditions from roughing to finishing conditions. Therefore, the detection level can be set for any machining condition without an unnecessary change to the machining status and with high detection accuracy maintained. Unlike in the conventional techniques, it is no longer necessary in the present embodiment to detect the machining gap impedance by forcing a voltage to be applied during the stop time.

Figure 3B:
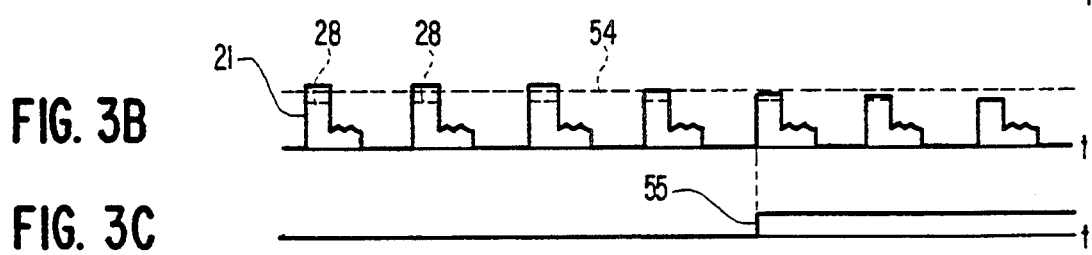
Figure 3C:

FIGS. 3A-3C illustrate the machining gap impedance detection operation when a given output impedance (here, 51) has been set for a given machining condition. Other levels 49-53 may be chosen according to the machining conditions currently existing.

In this manner, the same degree of gap status abnormality (55) can be continuously detected at an identical detection level 54, with the output impedance 9 of the detecting power supply 7 being changeable and settable to different levels 49-53 for various machining conditions. A decrease in the output impedance, for example from level 51 to level 52, will result in a lower gap impedance being considered acceptable.

The abnormal machining gap status is a status wherein the machining gap impedance has fallen below a predetermined value. As soon as the machining gap has become abnormal as indicated by the numeral 55 in FIG. 3C, finer control can be carried out if the machining gap impedance during machining can be detected momentarily, in addition to the detection at the abnormal status timing.

Figure 4A:
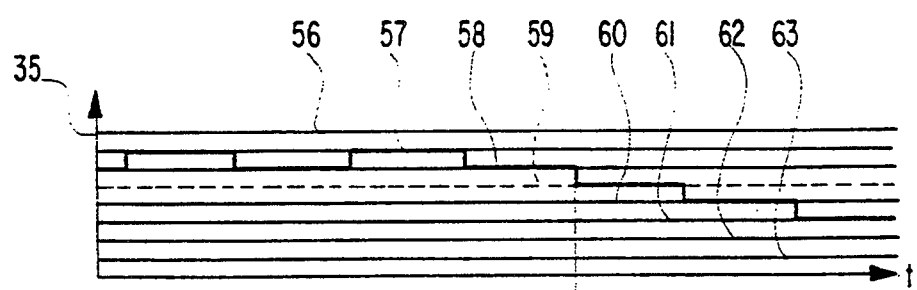
FIGS. 4A–4C are timing charts illustrating the operation of detecting the machining gap impedance when the output impedance of the detecting power supply is changed and controlled for a given detection threshold value.
Figure 4B:
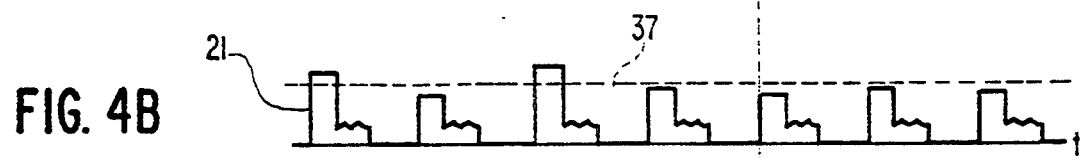
Figure 4C:
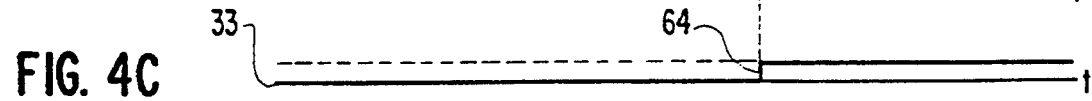
Figure 10:
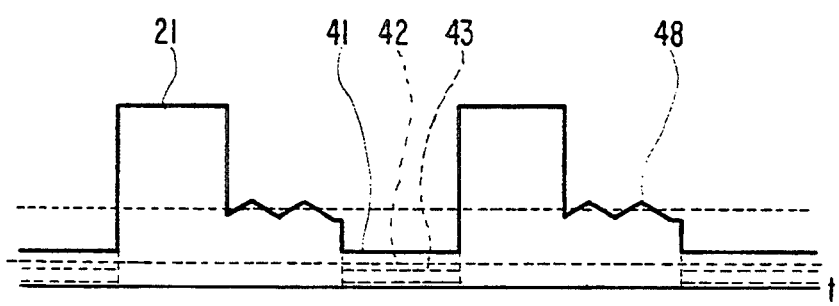
FIG. 10 is a machining gap voltage waveform diagram illustrating an example of the machining gap impedance detected by the application of a voltage during a stop time in the prior art system.
Figure 11:
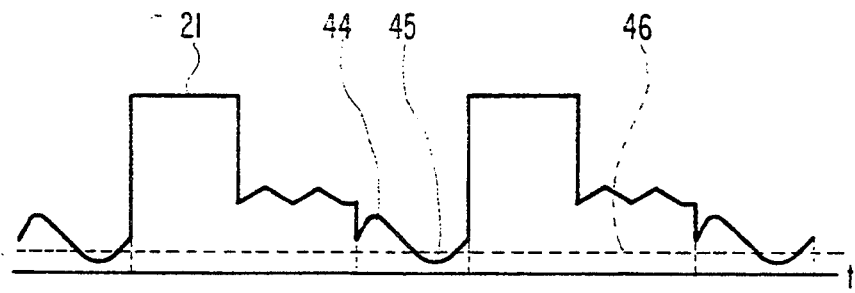
FIG. 11 is a machining gap voltage waveform diagram showing the shortened stop time under finishing machining conditions in the prior art system.

FIGS. 4A-4C provide an example of such finer control, wherein FIG. 4A indicates the output impedance 9, FIG. 4B shows the machining gap voltage pattern and FIG. 4C indicates the detection of an abnormal status (64).

By stepwise increasing the detecting power supply impedance 9 each time the machining gap impedance is higher than a predetermined detection level 37 and decreasing the detecting power supply impedance each time the machining gap impedance is lower, the detecting power supply impedance is kept within a predetermined normal range of impedances (57 to 58) while normal machining is performed.

As the machining gap impedance gradually drops in the process of machining, despite the lowering of the power supply impedance 9, the detecting power supply impedance 9 also begins to drop out of the aforementioned range and finally drops to a threshold abnormal level 59. This occurs with the same timing as the change 55 in FIG. 3C. Based on this timing, arc avoidance control can be carried out.

However, as compared to the control in the conventional art, wherein avoidance operation is performed by the detection of an abnormal status, as it were, on a trial and error basis, the example shown in FIGS. 4A-4C allows faster and more accurate control, i.e., more efficient and faster machining, since it detects status changes as successive values and therefore can employ a continuous-system control process.

While the impedance of the machining gap is detected by changing the impedance of the machining gap status detecting DC power supply 7 in the above embodiments, an identical effect may also be produced by changing the output voltage of the machining gap status detecting DC power supply 7 without directly changing the impedance 9 of the machining gap status detecting DC power supply 7.

FIGS. 5A-5C and FIGS. 6A-6C show an embodiment wherein the output voltage of the machining gap status detecting DC power supply 7 is changed.

Referring to FIGS. 5A-5C, the output voltage of the machining gap status detecting DC power supply 7 is set to a set value 68 according to the current machining conditions. By changing the setting of the output voltage of the machining gap status detecting DC power supply 7, for example using set values 66-70, the current supplied to the machining gap can be varied, whereby a detection level can be changed in the same manner as when changing the output impedance.

FIGS. 6A-6C illustrate an embodiment wherein the output voltage of the machining gap status detecting DC power supply 7 is changed with respect to a specific threshold value. The output voltage of the machining gap status detecting DC power supply 7 is stepped lower each time the machining gap voltage 21 is higher than a threshold value 81, and is stepped higher when it is lower, thereby maintaining the output voltage of the machining gap status detecting DC power supply 7 fairly stable between levels 77, 78 when the gap voltage is in the vicinity of the threshold value 81 and fluctuating. Once the gap voltage remains below the threshold for some predetermined number of cycles, however, the voltage of the power supply 7 passes through a threshold level 76, causing the abnormal status signal 83 (FIG. 6C) to be generated. Hence, by applying and varying the output voltage of the machining gap status detecting DC power supply 7, the machining gap status can be detected without changing the machining status.

It will be apparent that the present invention, as described above, allows a machining gap status to be detected accurately, an arc to be avoided reliably, and maximum machining speed to be provided.

What is claimed is:

1. A power supply for an electric discharge machining system, comprising:
a first power supply for supplying machining energy to a machining gap, a second power supply different from said first power supply for supplying machining energy to said machining gap and means for changing an output impedance of said second power supply according to machining conditions.

2. A power supply for an electric discharge machining system defined in claim 1, further comprising detection means for comparing a voltage across said machining gap with a set value defined according to machining conditions and determining whether said machining gap voltage is larger or smaller than said set value.

3. A power supply for an electric discharge machining system defined in claim 1, including first control means for detecting a machining gap voltage applied by the second power supply and reducing the output impedance of said second power supply if the machining gap voltage falls below a predetermined value.

4. A power supply for an electric discharge machining system defined in claim 2, including first control means for detecting the machining gap voltage applied by the second power supply and reducing the output impedance of said second power, supply if the machining gap voltage falls below said set value.

5. A power supply for an electric discharge machining system defined in claim 1, including control means for detecting a machining gap voltage applied by the second power supply and raising the output impedance of said second power supply if the machining gap voltage rises above a predetermined value.

6. A power supply for an electric discharge machining system defined in claim 2, including control means for detecting the machining gap voltage applied by the second power supply and raising the output impedance of said second power supply if the machining gap voltage rises above said set value.

7. A power supply for an electric discharge machining system defined in claim 3, including second control means for detecting the machining gap voltage applied by the second power supply and raising the output impedance of said second power supply if the machining gap voltage rises above a second predetermined value.

8. A power supply for an electric discharge machining system defined in claim 4, including second control means for detecting the machining gap voltage applied by the second power supply and raising the output impedance of said second power supply if the machining gap voltage rises above a predetermined value.

9. A power supply for an electric discharge machining system, comprising:
a first power supply for supplying machining energy, a second power supply having an output voltage higher than that of said first power supply and an output impedance higher than that of said first power supply, and means for changing the output voltage of said second power supply according to machining conditions.

10. A power supply for an electric discharge machining system as defined in claim 9, further comprising detection means for comparing a machining gap voltage applied to a machining gap with a set value defined according to machining conditions and determining whether said machining gap voltage is larger or smaller than said set value.

11. A power supply for an electric discharge machining system as defined in claim 9, further comprising first control means for detecting a machining gap voltage and raising the output voltage of said second power supply when the machining gap voltage falls below first predetermined value.

12. A power supply for an electric discharge machining system as defined in claim 9, further comprising control means for detecting a machining gap voltage and reducing the output voltage of said second power supply when the machining gap voltage rises above a predetermined value.

13. A power supply for an electric discharge machining system as defined in claim 10, further comprising first control means for detecting a machining gap voltage applied by the second power supply and raising the output voltage of said second power supply when the machining gap voltage falls below a first predetermined value.

14. A power supply for an electric discharge machining system as defined in claim 10, further comprising control means for detecting a machining gap voltage applied by the second power supply and reducing the output voltage of said second power supply when the machining gap voltage rises above a predetermined value.

15. A power supply for an electric discharge machining system as defined in claim 11, further comprising second control means for detecting a machining gap voltage and reducing the output voltage of said second power supply when the machining gap voltage rises above a second predetermined value.

16. A power supply for an electric discharge machining system as defined in claim 13, further comprising second control means for detecting a machining gap voltage applied by the second power supply and raising the output voltage of said second power supply when the machining gap voltage falls bellow a second predetermined value.

* * * * *